Figure 2:
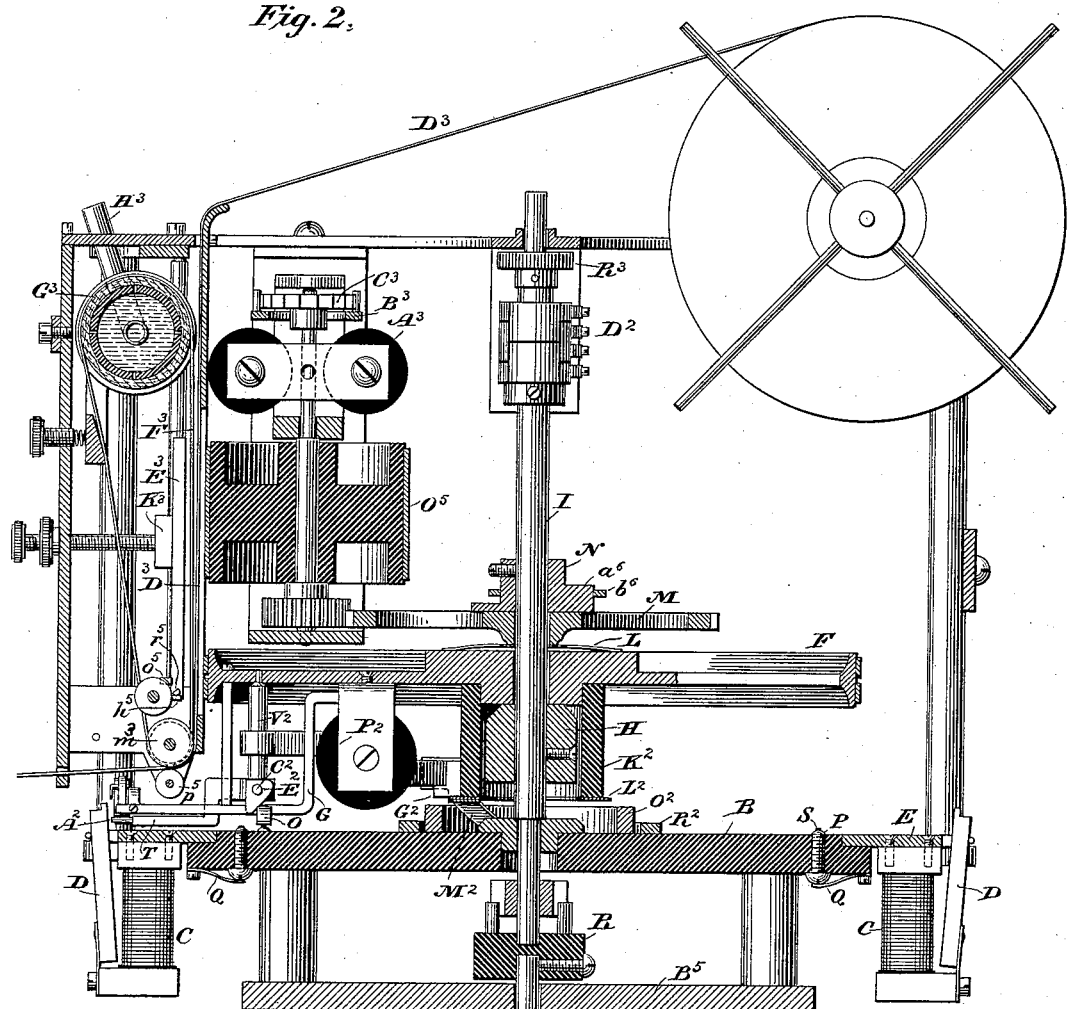

(No Model.) 8 Sheets—Sheet 1.
M. D. PORTER.
STATION AND WANT PRINTER.
No. 407,416. Patented July 23, 1889.
*Fig. 1.*
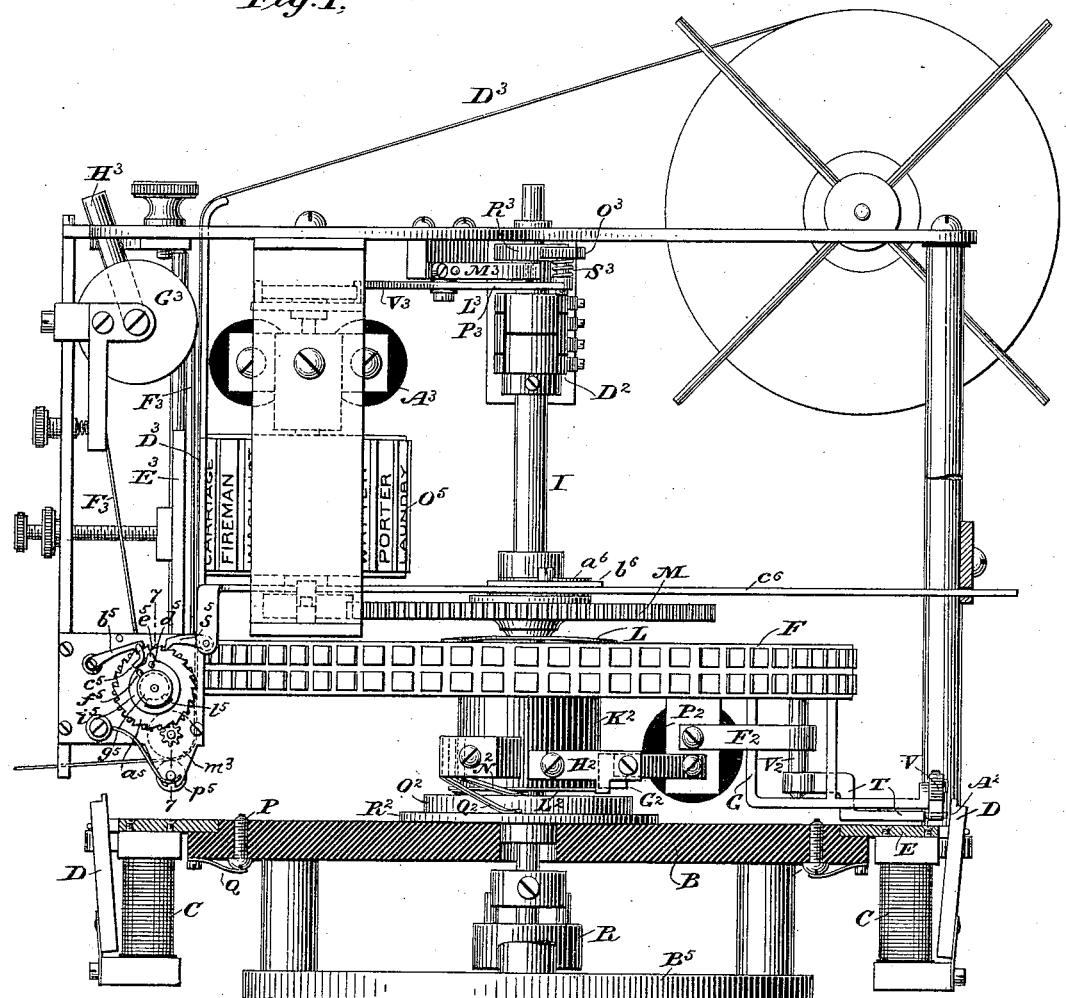
*Fig. 7.*
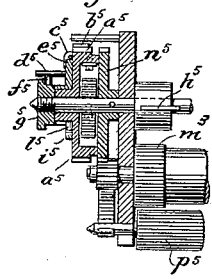
*Fig. 7.ª*
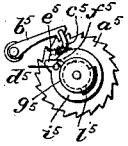
Witnesses
Geo. W. Breck
C. E. Ashley
Inventor
Major D. Porter
By his Attorneys Townsend & MacArthur (No Model.)  8 Sheets—Sheet 2.

M. D. PORTER.
STATION AND WANT PRINTER.

No. 407,416. Patented July 23, 1889.

Witnesses
Geo. W. Breck.
Carrie E. Ashley

Inventor
Major D. Porter
By his Attorneys
Townsend & MacArthur (No Model.)
8 Sheets—Sheet 3.

M. D. PORTER.
STATION AND WANT PRINTER.

No. 407,416. Patented July 23, 1889.

Witnesses
Geo. W. Breck
Carrie E. Ashley

Inventor
Major D. Porter
By his Attorneys
Townsend & MacArthur (No Model.) 8 Sheets—Sheet 4.

M. D. PORTER.
STATION AND WANT PRINTER.

No. 407,416. Patented July 23, 1889.

Witnesses
Geo. W. Breck.
Carrie E. Ashley

Inventor
Major D. Porter
By his Attorneys
Townsend & MacArthur

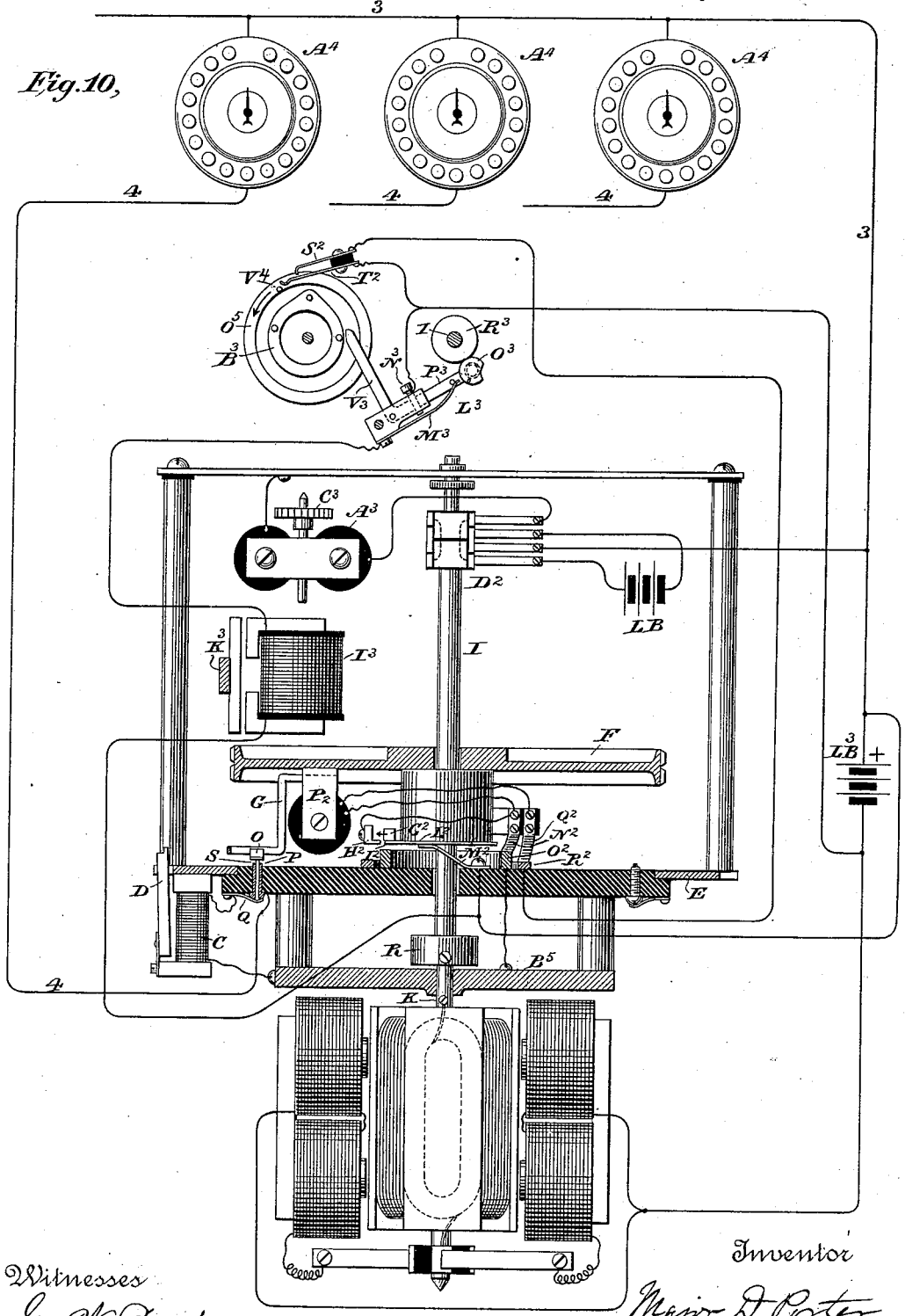

(No Model.) 8 Sheets—Sheet 6.

M. D. PORTER.
STATION AND WANT PRINTER.

No. 407,416. Patented July 23, 1889.

Witnesses
Geo. W. Breck.
Carrie E. Ashley.

Major D. Porter
By his Attorneys
Townsend & MacArthur (No Model.)  8 Sheets—Sheet 8.

M. D. PORTER.
STATION AND WANT PRINTER.

No. 407,416. Patented July 23, 1889.

Witnesses
Geo. W. Breck
Fred H. Capel

Inventor
Major D. Porter
By his Attorney
H. L. Townsend

UNITED STATES PATENT OFFICE.

MAJOR DANE PORTER, OF BROOKLYN, NEW YORK, ASSIGNOR TO THE PORTER TELETYPE COMPANY, OF NEW YORK.

STATION AND WANT PRINTER.

SPECIFICATION forming part of Letters Patent No. 407,416, dated July 23, 1889.

Application filed May 11, 1888. Serial No. 273,576. (No model.)

*To all whom it may concern:*

Be it known that I, MAJOR DANE PORTER, a citizen of the United States, and a resident of Brooklyn, in the county of Kings and State of New York, have invented a certain new and useful Station and Want Printer, of which the following is a specification.

My invention relates to a combined station and want or message indicator, suitable for use in hotels, manufactories, district-telegraph systems, or other locations where it is desired to provide at a number of separate points a means for indicating at a common station or point both the number or location of any particular station from which a call or message comes and the nature of the want, request, or other communication from the person at the station.

The primary object of my invention is to provide a means whereby the number of the station and the want, message, or other communication may be printed at the common receiving-station, this result being effected by suitable manipulation of a transmitter at any one of the separate stations.

In carrying out my invention I propose to indicate or print the number of the station or transmitter by controlling the position of a rotary stop-arm or similar device at the central office, which is brought to rest at a point corresponding to the station calling, and for this purpose the separate circuits for the various stations are disposed at the central station in the circumference of the revolution of the stop-arm, and the arm is brought to rest at the desired point by the action of a stop-magnet, which is in the circuit of the station calling, at the time the indicator is in position to indicate such station.

My invention consists in the general combinations of apparatus to be hereinafter described, and then more specifically indicated in the claims, and also in the special devices for throwing out the printed slip or tape bearing the number of the station and the want or message into position where it may be detached; for controlling the action of the printing-magnet; for rewinding the ejecting mechanism of the paper strip; for permitting a number of wants, messages, or characters to be printed in succession without resetting the transmitter at a station for zero; for supplying motive power to the rotary stop-arm and type-wheels, and for other purposes whereby the general and special objects of my invention are accomplished, as will more particularly hereinafter appear.

In carrying out my invention I employ at the central station or office a type-wheel bearing figures or other characters indicating the location of the outlying stations, each of which is connected with the central station by an independent wire or circuit normally open. The type-wheel, being normally at rest, is caused to revolve by any suitable means (but preferably by an electric motor included in a common return for the normally-open circuits) whenever any circuit is closed and continues to revolve until stopped by an electro-magnet in the circuit of the station calling.

In the form of my invention herein described I employ a separate stop-magnet in each circuit, and the armatures thereof being normally out of the path of the stop-arm or other projection carried by or moving with the type-wheel allow the same to revolve until the magnet is reached, whose armature is drawn forward into the path of the stop, when the type-wheel comes to rest with the number of the station opposite the printing-pad. When the room or indicating mechanism has thus been set, connection is automatically made between the circuit of the station calling and the devices controlling the operation of a second type-wheel, which may be simply furnished with the letters of the alphabet, but is, by preference, provided with types suitably arranged, whereby the want or message may be printed at a single impression. Thus in the case of a want-printer for a hotel a printing-drum would be employed, on which the places of the letters of the alphabet would be taken by full words, such as " Porter," " Fire," " Doctor," " Boots," &c. Connected with this second type-wheel and arranged to operate correspondingly therewith is a proper pulsator for producing electric pulsations or other changes of electric condition on the circuit calling, which continue until, by the operation of the transmitting mechanism, a circuit-breaking point is reached in the apparatus at the station, which point corresponds to the call or message to be transmitted. When this point is reached, the type-wheel comes to rest, it being controlled or operated by such pulsations, and the printing is then effected automatically by devices to be presently described.

At the station calling, the transmitter is arranged on a normally-open circuit, and the depression of any one of a series of keys or buttons corresponding to the wants or messages to be printed first effects the closure of the circuit, thereby starting the room or station indicating wheel, and at the same time causes a break in one of a series of branches of the circuit, which are successively closed by the action of a rotary commutator at the box, which is caused to rotate by the operation of the pulsator at the central station. The commutator at the box is controlled or operated by an electro-magnet therein responsive to the pulsations and moves in unison with the type-drum at the office and in a direction away from its unison or zero point of rest. When the commutator reaches the branch which is opened by the push-button that is depressed, the type-drum comes to rest, as just explained. On releasing the push-button the circuit is closed and the type-wheel at the central station and the commutator at the outlying station both resume their movement in the same direction under the action or control of the pulsations until the open branch or circuit corresponding to another button which may have been depressed is reached, or until the zero or normally-open circuit point of the transmitter is reached. Each push-button controls a normally-closed branch of the circuit through the commutator at the box. Each such branch being normally closed, the depression of the corresponding button breaks the branch.

Having indicated the general nature of the apparatus, I will proceed to describe the same in detail.

Figure 8:
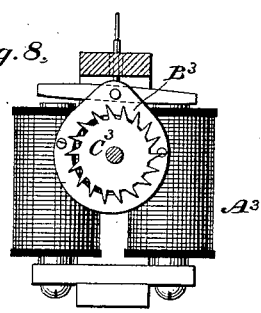
Figure 9:
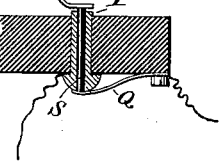
Figure 3:
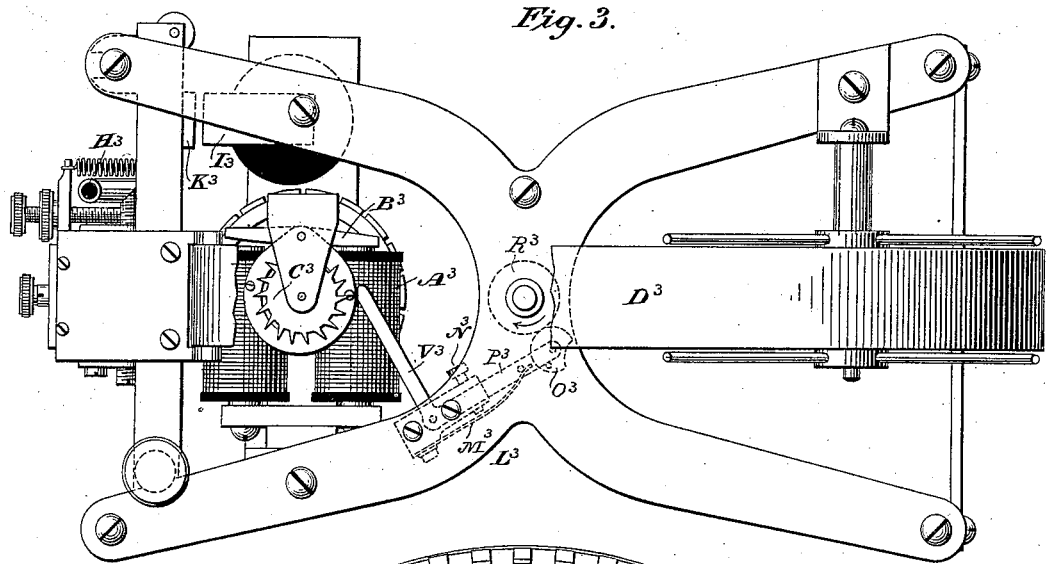
Figure 4:
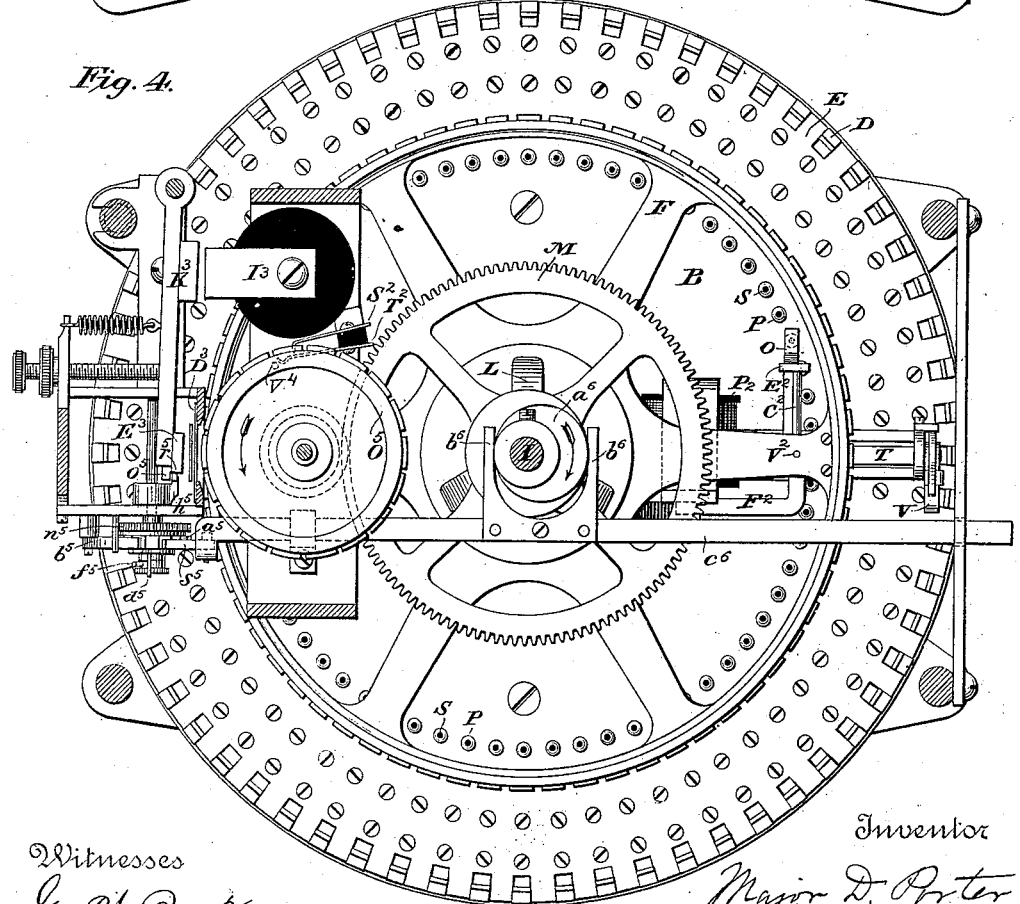
Figure 5:
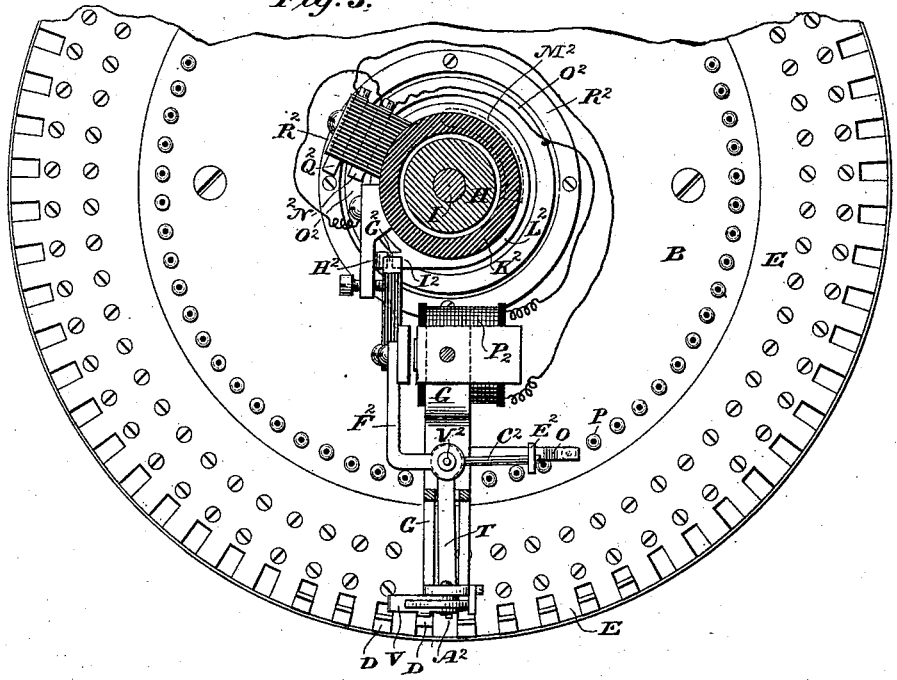
Figure 6:
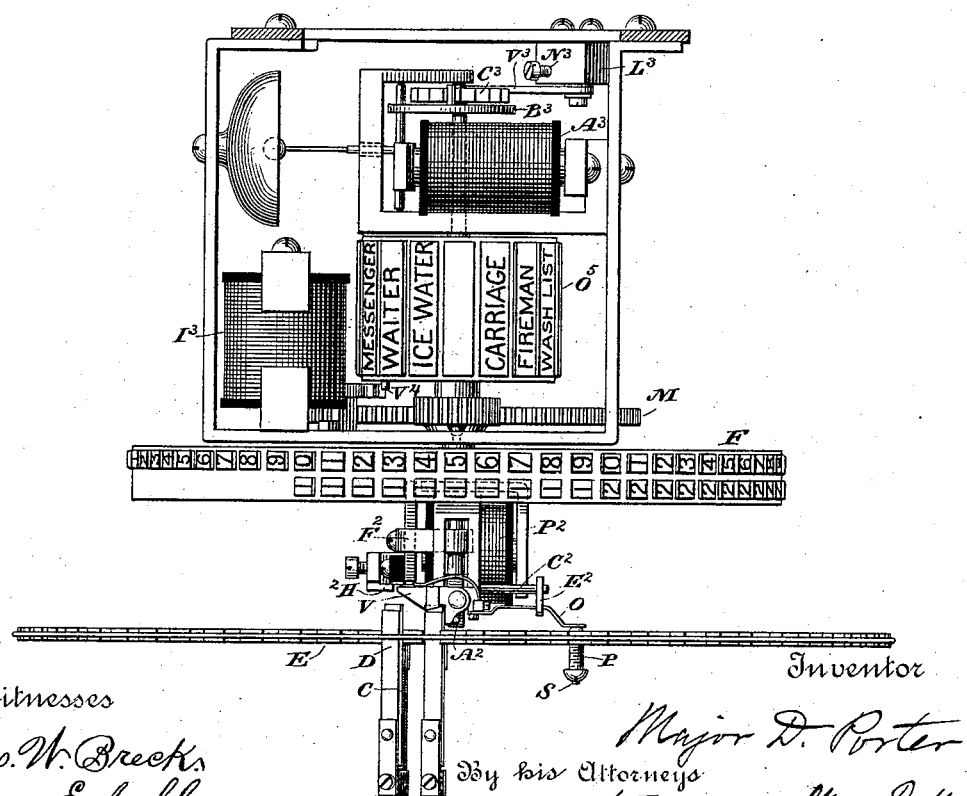
Figure 11:
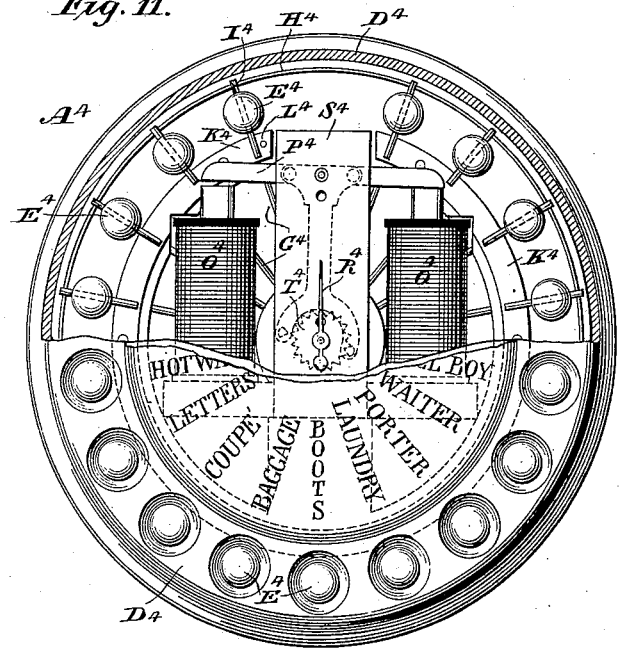
Figure 13:
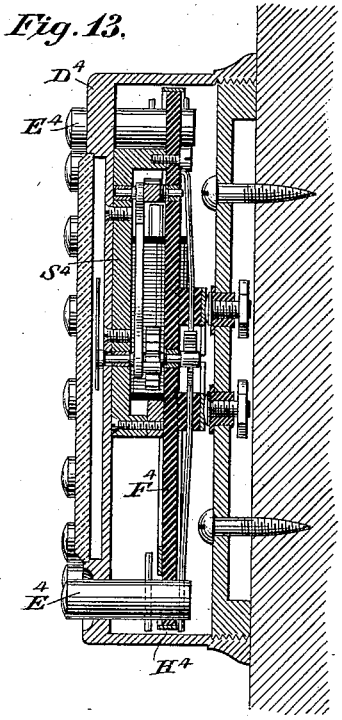
Figure 12:
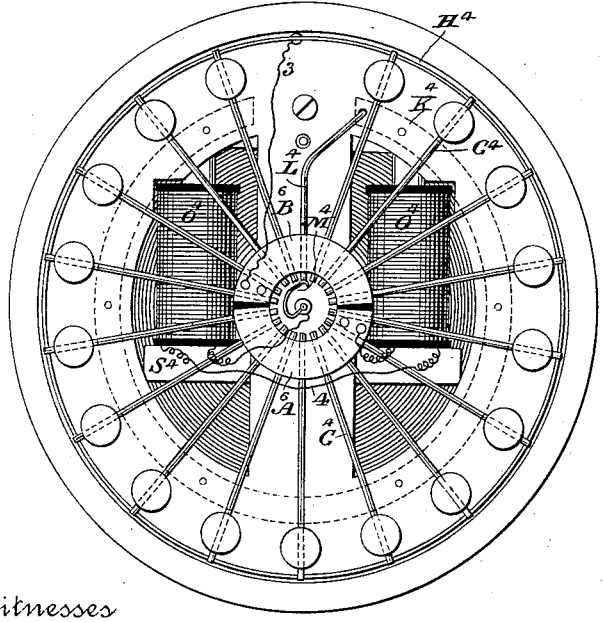
Figure 14:
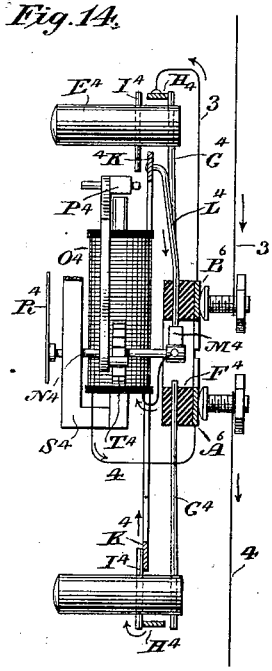
Figure 15:
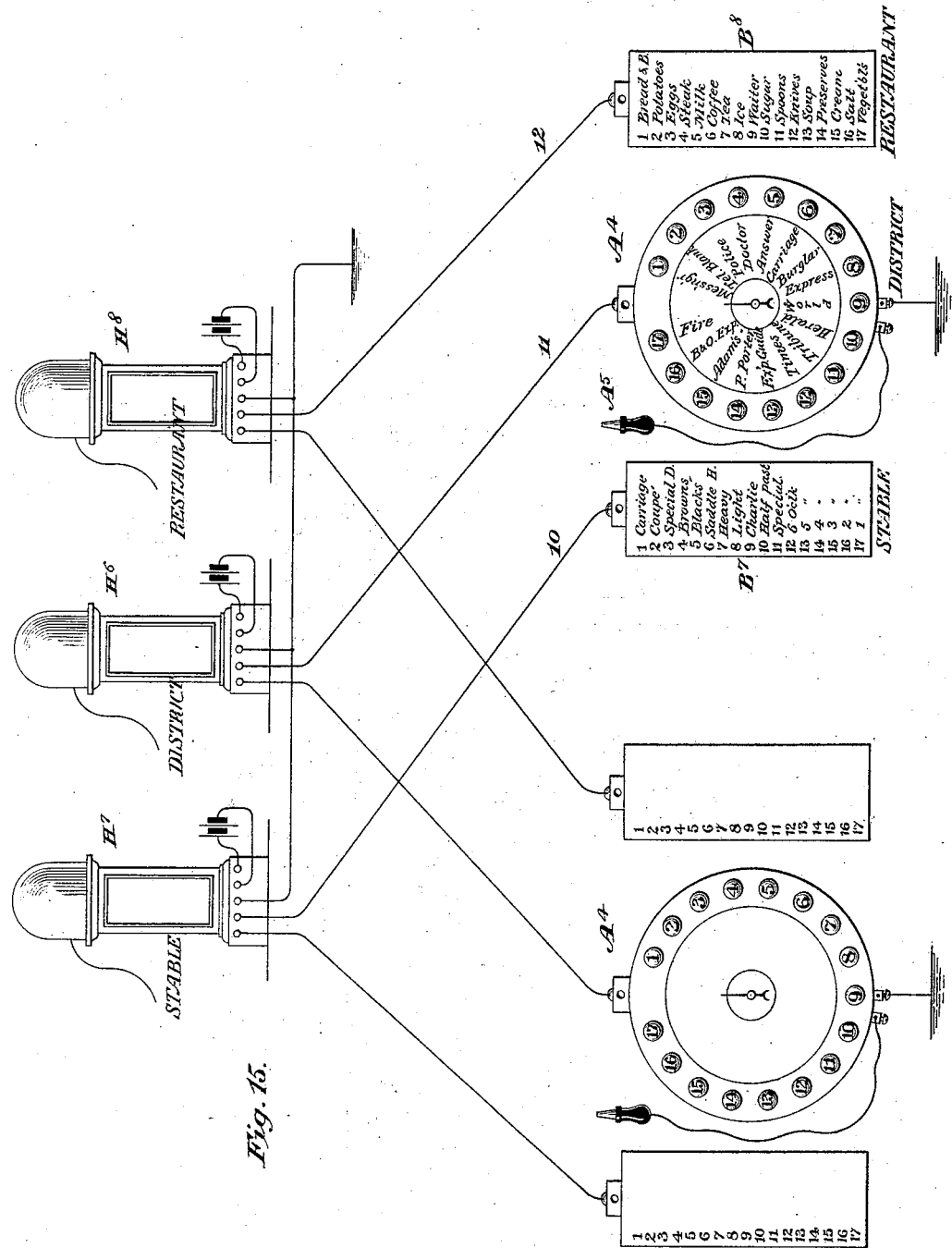
Figure 16:
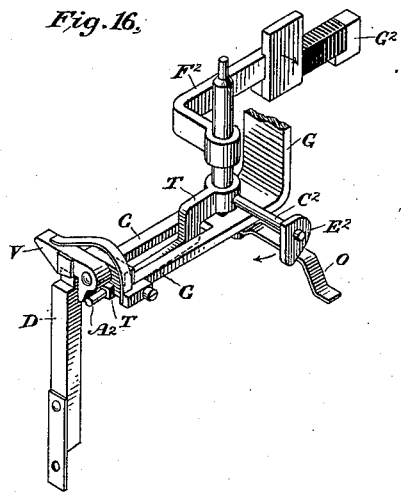

Referring to the accompanying drawings, Figure 1 is a side elevation of the apparatus at the central station. Fig. 2 is a vertical central section through the upper portion of the same. Fig. 3 is a plan of the top portion of the apparatus. Fig. 4 is a plan of the apparatus below a horizontal line drawn above the want or message drum. Fig. 5 is a plan of the stop-arm and connected magnet. Fig. 6 is a side elevation of the apparatus from the side at which the paper strip is ejected, and shows the stop-arm and attachments in end view. Fig. 7 is a vertical cross-section on line 7 7, Fig. 1, through the mechanism for operating the feed-drum which ejects the paper slip or strip after the number of a station and the want have been impressed thereon. Fig. 7$^a$ shows a part of the paper feeding or ejecting mechanism in one of its positions. Fig. 8 is a plan of the type-drum-controlling magnet and escapement. Fig. 9 is a cross-section through one of the electric switches employed. Fig. 10 is a diagram illustrating the connections of the apparatus. Fig. 11 is a plan of the transmitter at a station, with the cover-plate broken away. Fig. 12 is a plan of the same looking from the rear. Fig. 13 is a cross-section through the transmitter. Fig. 14 shows parts of the apparatus detached from the box. Fig. 15 is a diagram illustrating applications of the apparatus. Fig. 16 shows in perspective a detail of construction enlarged.

A indicates a suitable frame or pedestal, upon which is supported the plate B, carrying at its periphery a number of electro-magnets C, which form the stop-magnets of the rotary room or station type-wheel. Above the plate or table B are sustained posts and a frame-work, in which the various mechanisms are properly supported and in which the rotary wheels and shafts are properly journaled. In the pedestal or base of the apparatus is preferably supported the driving electric motor, as indicated, or other suitable driving power for the type-wheels and other devices. The electro-magnets C are supported from the plate E, resting on the periphery of the plate B, and having suitable notches, as indicated, into which the armatures D of the electro-magnets fit rather snugly, so that the shock of the stop-arm rotating with the type-wheel may be taken off the armatures and sustained principally by the plate.

F indicates the room or station indicating type-wheel, which carries or is connected with a stop-arm G, that extends out to the periphery of the plate or table B and into position to engage with the armature D of any electro-magnet when such armature is drawn up from its retracted position into a position where its upper or free end will be in the path of such stop-arm. The portion of the stop-arm that engages with the stop-armature is peculiarly constructed, as will presently appear. The type-wheel F is loosely supported upon a hub H, fastened to the shaft I, which is connected with or forms a continuation of the driving-shaft K of the electric motor or other motive power.

Motion is communicated to the wheel F by means of a spring L, which surrounds the shaft I and bears with considerable friction against the hub of the wheel F, being held against the same between said hub and the hub of a gear-wheel M, above which is a collar N, fastened to the shaft I. The spring likewise serves to communicate motion frictionally from the shaft to the wheel M, which latter gears with a wheel upon the shaft or spindle of the want or message printing drum $O^5$.

Connected also with the type-wheel F, so as to move therewith and with the stop-arm, is a contact-spring O, which travels over a series of contact-points P, supported in a plate B, which latter is conveniently made of insulating material. The spring O is conveniently supported from the contact-arm G itself, and, through the attachment of the latter with the metal part of the type-wheel, is in electrical connection with the shaft and frame of the apparatus. The contact-spring O moves with the type-wheel over the series of contact-studs P, normally out of electrical connection therewith, but is brought into connection with a stud or contact P whenever the stop-arm and wheel are brought to rest.

The electro-magnets C, as before explained, are in the separate circuits leading, respectively, from the stations or transmitter-boxes, this being effected by carrying the circuits to the individual contact-studs P, upon the lower ends of which bear normally suitable springs Q, that in turn connect with the coils of electro-magnets C, and thence with the lower part of the frame, which is insulated from the upper part by means of the plate B and the clutch R, which is of insulating material and is interposed between the shafts K and I.

Passing through each of the contact-studs P is a pin S, of insulating material, which bears at its lower end on the spring Q and serves to disconnect the spring from the pin P when the contact-spring O is depressed against the latter and the pin S.

The object of disconnecting the spring Q and the stud is to cut out the electro-magnet C of the circuit in use, thus removing the resistance thereof from the circuit when the spring O connects with P, and to bring into circuit the want or message printer, as will be described farther on. A farther object is to cut off the connection of the line with the common return wire or connection for all the lines, so as to prevent interference from other lines in case the circuit of a second line should be closed after one line is placed in connection with the message-receiver.

It is to be observed that when the spring O trails behind the contact-arm, as in the construction shown, care should be taken to connect the spring Q and contact-stud with the coils of an electro-magnet C, removed a proper distance forward in the direction of revolution of the arm, so that when the arm is stopped by an electro-magnet the spring shall make contact with the stud connected with such magnet and the circuit thereof.

Mounted on the end of the stop-arm, as indicated more clearly in Fig. 6, is a latch or catch V, having a spring which tends, as shown, to depress the horizontal arm of said catch down into position behind the armature of the magnet in action, while the vertical arm of said latch is arranged to engage with the side of the armature-lever, thereby bringing the stop-arm to rest. When the catch or latch and the armature are thus engaged, the horizontal arm of the catch is thrown down behind the armature, thus holding the same up, although the circuit through said magnet may be broken, while the vertical arm engages with a pin $A^2$, projecting behind said arm from the end of a lever T, which extends from a rock-shaft $V^2$, pivoted in suitable bearings on the type-wheel F, and the arm G, as indicated.

Extending from the lever T or the rock-shaft to which the same is secured is an arm $C^2$, carrying at its end a cam $E^2$, which, when the lever T is thrown to one side by the action of the pivoted catch V upon the pin $A^2$ at the time of engagement of the said stop-arm with the armature, acts upon the spring O, so as to depress the same into connection with the stud or contact P.

Extending also from the rock-shaft, so as to move with or actuate the lever T, as may be required, is an arm $F^2$. Supported by said arm, but insulated therefrom, is a contact-plate $G^2$, that serves to close or open the contacts of an electric switch consisting of two contact-plates $H^2$ $I^2$. Plate $H^2$ is carried by a block fastened to the sleeve $K^2$, of insulating material, fixed to the type-wheel or other part of the apparatus moving therewith, while the contact-plate $I^2$ for said switch is fastened to a circular plate $L^2$, also secured to said sleeve, of insulating material. These two plates $H^2$ $I^2$ are kept in constant electrical connection with an external local circuit by means of the springs $M^2$ $N^2$, the former of which is fixed to the plate B and bears constantly against the ring or plate $L^2$, while the latter, which is supported by an insulating-block secured to the sleeve $K^2$ and is electrically connected with the support for $H^2$, as shown in Fig. 5, bears constantly upon a ring $O^2$, mounted upon the base-plate B, of insulating material. By this expedient the switch may be opened or closed at any point in the revolution of the type-wheel by the arm or other device which moves with said type-wheel, and is operated upon by the stop devices for bringing said wheel to rest and for releasing the same.

$P^2$ indicates an electro-magnet of any suitable character, which is preferably mounted, as shown, upon the type-wheel so as to move therewith, and has an armature which is secured to the arm $F^2$ or other part connected with lever T and with switch-contact $G^2$. The connection for the magnet with a suitable source of electricity and a controlling-switch is, through the spring $N^2$, connected to one terminal of said magnet and a second spring $Q^2$, mounted on an insulating-block and bearing constantly upon a ring of metal $R^2$, secured to the plate B, as shown.

The lever T is thrown in one direction by the impingement of the stop-arm upon the armature-lever of any electro-magnet C, thereby closing the switch at $H^2$ $I^2$, and also bringing the turning-spring O into contact with the corresponding stud P. The arm of lever T is moved in the other direction by the action of the electro-magnet $P^2$, thereby opening the switch at $G^2$ $I^2$, permitting the spring O to break the connection at the contact P, and acting on the latch V, so as to lift the horizontal arm of the same from behind the armature-lever, which is thereby permitted to fall back out of the way of the vertical arm. The action of the electro-magnet P² is controlled by some device moving with the want or message type-drum O⁵. A suitable switch for this purpose is indicated in Fig. 10, and consists simply of two contact-springs connected with electro-magnet P², as will be presently described, and normally insulated from one another. One of said springs is in the path of an operating stud or projection V⁴, that is secured to the type-drum O⁵. The springs S² T² are properly secured to a block of insulating material fastened to some portion of the frame, as indicated in Fig. 4, and are properly located so that the projection V⁴ will operate upon them and close the circuit just before the time when the drum reaches the zero or unison point at the completion of the operation of the apparatus, in the manner to be presently described.

A³ indicates a controlling electro-magnet, which operates upon or controls the escapement-lever B³ for an escapement-wheel C³, secured to the shaft of the drum O⁵. The impelling or controlling escapement may be of any desired form. The electro-magnet A³ is in connection with the spring O by means of the frame of the apparatus, the shaft I, and the conducting portion of the type-wheel F, or is placed in connection with said spring O in any other suitable manner. The opposite terminal of the controller-magnet A³ is connected with one of the springs of a pulsator D² of any suitable character. That shown consists of a pole-changer of any desired construction operated by the shaft I, or a part moving therewith, so as to produce pulsations for controlling the movement of the drum O⁵. The current which is alternated or pulsated, as described, may be derived from a battery L B, which is independent of a battery L B³, employed for operating the electric motor in the base of the apparatus and for actuating the electro-magnets C. The pole-changer or pulsator D² being of the ordinary character need not be described further in detail. The armature-lever and the type-drum O⁵ are properly mounted in any desired manner in the frame or in parts connected therewith. The electro-magnet is constructed to respond to alternations of the electric current.

D³ indicates a strip or ribbon of paper which is fed from a suitable reel over the faces of the type-wheel F and the type-drum O⁵ and between the same and a suitable printing-pad E³, as indicated more clearly in Fig. 2. The paper ribbon, after passing the type wheels or drums, is fed out through feed-rolls $m^3 p^5$, to be presently described, which are suitably constructed and controlled to feed the paper after an impression to such a distance as to bring the portion of the ribbon bearing such impression out of the apparatus, where it may be detached.

The inking device for the wheels consists of an inking-ribbon F³, which passes over suitable rolls G³ $m^3$ and between the message sheet or ribbon and the face of the printing-pad. By passing the ribbon over the feed-roll $m^3$, or a part of the same of reduced size, as will be presently described, a fresh portion of inking-ribbon is presented before each impression. The drum G³ is preferably made hollow, as shown in Fig. 2, and is filled with ink through a tube H³, connecting with the hollow shaft for said drum in obvious manner. The interior portion of the drum is sealed up and is formed with perforations through which the ink may escape into an outer layer or surface thereon formed of some absorbent material from which the inking-ribbon may take up fresh ink.

The printing-pad E³ is operated by means of an electro-magnet I³ of any suitable character, whose armature is connected or attached to the lever K³, carrying the printing-pad. The operation of the printing-magnet is governed by a circuit-controller, (indicated at L³). This controller consists of a spring M³, normally held out of contact with a contact-stud N³ by means of a rotary cam O³ of irregular contour, as indicated, which cam is mounted upon the vibratory or movable support P³, having a stud bearing against the free end of the spring M³. By a means to be presently described the rotary cam O³ is moved intermittently out of contact with a rotary impelling disk or wheel R³, which constantly tends to move the cam O³, so as to move the depressed portion of the cam into coincidence with R³. Whenever this occurs the spring M³ is permitted to make contact with the stud N³, closing the circuit to the printing-magnet. A spiral spring S³, connected with the cam O³, tends to move the same in a direction opposite to that in which the wheel R³ acts upon the cam. A suitable stop is provided for limiting the rotary movement of the cam. It will be seen, therefore, that if the cam is permitted to remain in contact with the driving-surface of wheel R³ for a determinate time the circuit-controller will be permitted to act, owing to the fact that the depressed portion of the cam will permit the lever P³ to fall aawy. If, however, the cam is moved away from the wheel R³ for an instant, the spring S³ for said cam will rotate the same, so as to carry its depressed portion around and in a direction away from the engaging-surface of the wheel R³ to a distance determined by the position of the stop for the cam. The intermittent disconnection of the cam and wheel R³ is to be produced so long as the type-drum O⁵ continues to rotate. When, however, the rotation stops and the cam and wheel R³ remain in engagement, the circuit-controller comes into action to effect the printing. The connection and disconnection of the cam and wheel are conveniently effected by means of the arm V³, extending from lever P³ into the path of the vibrating escapement B³. By this means at every whole vibration of said escapement the rotary cam is disconnected from its driving-wheel and allowed to resume its normal position. When the escapement comes to rest through the cessation of the pulsations or alternations of current in the circuit including magnet $A^3$, the printing will be effected. The position assumed by the escapement when brought to rest by the action of the transmitter is always that shown in Fig. 10 and corresponds to a current of certain polarity. The polarity of current is the same as that required to operate the commutator at the transmitter to bring the same into circuit-breaking position, as will be described farther on.

It will of course be understood that the stop electro-magnet C for each circuit is located at a proper point in the circumference of revolution of the stop-arm, so that when the type-wheel F is stopped by said magnet the number or character on said wheel corresponding to said magnet and circuit will be opposite the printing-pad $E^3$.

The paper feeding or ejecting mechanism is constructed as follows: The paper-feed roll (indicated at $m^3$) is made of larger diameter at its edges, where it engages with the paper strip, than at its center or intermediate portion, over which the inking-ribbon passes. The roll is connected by suitable gear with a wheel $n^5$, which may be either a spring or weight driven wheel, as desired. In the present case the wheel $n^5$ is shown as propelled by a spring, one end of which is connected to the wheel or shaft for the same, while the other is connected to a wheel $a^5$, which may be a ratchet-wheel or may be otherwise properly constructed, so that a suitable propelling or winding device may engage with the same for the purpose of rewinding the spring. The rewinding device is here shown as consisting of a pawl $s^5$, which is reciprocated by suitable connection with the driving-power for the indicators. The wheel $n^5$ is keyed to a suitable shaft, to which are connected a detent or stop arm $h^5$ and a pin or projection $f^5$, secured, as indicated, to a nut fixed to the shaft. The pin or stop-arm $h^5$ normally engages with a detent $r^5$, carried by some portion of the printing mechanism—as, for instance, the printing lever or pad. The wheel $n^5$ and the paper-feed roll are held from rotating normally by the detent $r^5$, which engages with $h^5$ when the printing-lever is retracted. When the lever is moved forward for effecting an impression upon the paper-strip, the wheel $n^5$ is allowed to rotate a short distance, but immediately thereafter is brought to rest by the detent $o^5$, with which the pin $h^5$ now engages. When, now, the printing-lever is retracted after the impression, the pin $h^5$ is disengaged and permitted to make nearly a complete revolution until again stopped by the detent $r^5$. By this revolution the paper strip is moved sufficiently to bring the impression out from the case of the machine, when it may be detached and used as a memorandum, and, if desired, subsequently filed away.

The retaining-pawl $b^5$ for the ratchet-wheel $a^5$ is provided with an arm $c^5$, with which an arm or projection $e^5$ tends to engage, so as to lift the pawl from engagement with the wheel, and thus permit the wheel to move backward against the actuating-pawl $s^5$. The arm or projection $e^5$ is carried by a loose disk or plate $i^5$, to which movement is communicated by a pin or projection $l^5$, carried by the ratchet-wheel or the hub of the same and engaging with an elongated notch or offset in the disk, as indicated more clearly in Fig. 1. By this device a lost motion of certain extent is permitted between the disk and the ratchet-wheel. When the spring is wound up sufficiently to cause the projection $e^5$ to lift the pawl $b^5$, the ratchet-wheel will be permitted to move back with the actuating-pawl $s^5$ as the latter recedes. As both reciprocate under these conditions, the wheel $a^5$ simply oscillates with the pawl, and the latter cannot engage with a fresh tooth. Overwinding is thus prevented. The loose disk $i^5$ carries also a pin $d^5$, with which the pin or projection $f^5$ is adapted to engage when the actuating-wheel $n^5$ for the feed-roll is released and permitted to make a complete turn. By this means the projection $e^5$ carried by the disk is moved beyond the lifting-arm $c^5$ of the retaining-pawl in the direction of revolution of the ratchet-wheel, so that the spring may be rewound ready for the next operation.

In the action of carrying the projection $e^5$ beyond the pawl the disk $i^5$ must evidently be permitted to move independently of that end of the coiled spring which is connected with the pin $l^5$. This is provided for by mounting the disk loosely and arranging by means of the extended notch in the disk for a lost motion between the disk and the pin $l^5$ sufficient to permit the projection $e^5$ to pass beyond the lifting-arm $c^5$ before the disk and pin $l^5$ again engage.

In the operation just described, which will be understood more clearly by reference to Fig. 7$^a$, as well as the other figures showing the paper-ejecting mechanism, it will be observed that the pin $l^5$ and disk are brought into engagement at the opposite end of the notch from that at which they are shown engaged in Fig. 1, and that the pin $f^5$ will have been brought around to the opposite side of the pin $d^5$ and left in engagement therewith. As the ratchet-wheel begins to rotate under the action of the pawl $s^5$, the pin $l^5$ will begin to move independently of the disk until it engages with the same in the position shown in Fig. 1, when the two will begin to move together until they assume finally the position indicated in Fig. 7. The pin $f^5$ will in the meantime have retained the position shown, which is that assumed after it has rotated the projection $e^5$ beyond lifting position and has been brought to a stop by the engagement of the detent-arm $h^5$ with the stop-pin $r^5$ of the printing mechanism, as shown in Fig. 2, at the termination of the full movement of the paper-feeding mechanism, which brings the impression into view, and which is permitted on the recession of the printing-lever, as before explained.

The reciprocating movement is imparted to the winding-pawl $s^5$ by means of an eccentric $a^6$, which is fixed to the shaft I and engages with projections $b^6$ from a plate or bar $c^6$, to which the pawl $s^5$ is secured. Any other mechanical device may be employed for communicating a reciprocating movement to the pawl from some portion of the mechanism driven by the motive power of the apparatus.

The electric motor employed for driving the shaft K may be of any desired character and may be driven from any suitable source. The source here shown is indicated at L $B^3$ as a galvanic battery, one pole of which leads, by a common leading-wire 3, to the series of transmitters $A^4 A^4$, distributed or located at any desired points. The opposite pole of the battery connects with one pole of the electric motor, as shown, while the other pole of said motor connects with the plate $B^5$, of conducting material, through the shaft for the motor.

To the plate $B^5$ all the electro-magnets C are connected. As these electro-magnets C are placed severally in the several circuits leading from the respective transmitters $A^4$, it will be obvious that the motor becomes a part of the common return for said separate circuits, and that if such circuits be normally open said motor will remain at rest, while on the closure of any circuit it will immediately begin to operate. The separate branches or circuits leading from the transmitters, respectively, are indicated by the numeral 4. Suitable electric connections are made, so that circuits through the apparatus may be formed as follows: from one pole of battery L $B^3$ through any transmitter $A^4$, so long as circuit is closed at the same, to a contact stud or block P, spring Q, electro-magnet C, frame or plate $B^5$, motor-shaft, electric motor, and back to the battery L $B^3$. When spring O makes connection with a stud P, the circuit just traced is broken at the point of spring Q, thus cutting out the electro-magnet C and the connection to the common return. Another circuit for the battery L $B^3$, which is formed at this time, is now formed through spring $M^2$, plate $L^2$, contacts $I^2 G^2 H^2$, spring $N^2$, ring $O^2$, wire connecting the same with plate $B^5$, and electric motor, as before, thus putting the motor in a local circuit with the battery L $B^3$ independently of the main circuits connecting the stations with the apparatus.

When spring O makes contact with any stud P, a connection from battery or generator L B is formed as follows: from one pole thereof through the lower spring of the pole-changer to wire 3, a transmitter $A^4$, through which circuit is supposed to be closed, stud P, corresponding to said circuit, spring O, shaft I, electro-magnet $A^3$, controlling the movements of printing-drum, and by way of the pole-changer to opposite pole of battery L B. When contact is closed by the circuit-controller $S^2 T^2$, the circuit is formed from the positive pole of battery L $B^3$ through spring $M^2$, contacts $I^2 G^2 H^2$, electro-magnet $P^2$, spring $Q^2$, plate $R^2$, springs $S^2 T^2$, and back to the opposite pole of the battery. When contact is closed at circuit-controller $L^3$, the circuit is formed from the positive pole of battery L $B^3$ through electro-magnet $I^3$, spring $M^3$, contact $N^3$, and back to the opposite pole of the battery.

The construction and connections of the transmitters are shown in Figs. 11, 12, 13, and 14.

$D^4$ indicates the case for the apparatus, secured to a suitable base-plate fastened to a proper support, while $E^4$ indicates a number of controlling push buttons or knobs designed to operate upon electric switches within the case, each of which switches when depressed closes the circuit for the box to the central office, and also breaks one of the connections of the line or circuit through a rotary or step-by-step commutator, which is moved by the operation of an electro-magnet $O^4$, contained within the box and responsive to the pulsations produced at the central station by the operation of the pulsator $D^2$. The commutator in the box may be formed in any desired way, but for the sake of simplicity is made by arranging the inner ends of a series of contact-springs $G^4$, upon which the push-buttons operate, in a circle, as indicated in Fig. 12, and in the path of a rotary circuit closing and breaking spring $M^4$. The springs $G^4$ are fixed at their inner ends in suitable blocks of insulating material, as shown, while their outer or free ends are connected with the push-buttons, and normally by their spring action make connection with a plate, ring, or wire $H^4$, permanently connected with one of the circuit-wires 3 after the manner indicated in Fig. 14. The contacts of the commutator formed by the inner ends of the springs $G^4$ are so arranged that the spring $M^4$ in moving over the same will keep up a continuous electrical connection by making connection with a new contact before breaking with the preceding one.

The number of teeth of the propelment or escape wheel with which the rotary spring is connected is such that a complete oscillation backward and forward of the escapement will be required in order to move the spring from position of connection with one contact into position of sole connection with the next contact—that is to say, that if the spring rests upon one of the contacts a movement of the armature of the electro-magnet, so as to vibrate the escapement one tooth, will allow or cause the spring to move into an intermediate position between the two contacts and in connection with both, while a reverse movement of the armature and the escapement to complete the whole oscillation will move the spring along out of connection with the preceding to the next contact of the series. The electro-magnet being polarized, it will be observed that a current of a given polarity will always be required in order to move the spring from the intermediate position between the two contacts into position, where it will break connection entirely with the first and rest solely upon the next contact. The polarity of current required to effect the second step of the movement just described is the same as that which is required in order to move the armature of the printing-drum magnet into the position shown in Fig. 10, where it will leave the arm $V^3$ of the circuit-controller $L^3$ free.

The initial or zero contact of the switch upon which it normally rests is formed by the inner end of a wire or connection $L^4$, permanently connected with a plate, strip, or contact ring $K^4$. Rods or pins $I^4$, of conducting material, carried by the several push-buttons $E^4$, are arranged to make connection simultaneously with the ring $H^4$ and the ring $K^4$ whenever any button is depressed. By means of the switch or circuit closers formed by the pins $I^4$ and rings $H^4 K^4$ the circuit may be closed by the depression of any button. The rotary arm $M^4$ is suitably connected by running a connection from the conducting-journal bearing for the same to the electro-magnet $O^4$, from which a connection is formed with the wire 4 in any suitable way. The circuit from 3 to 4 is, as will be seen, open, therefore, at the plate $K^4$ when the arm $M^4$ is at the zero-point, but may be closed through the operation of any push-button. The circuit will remain closed while the button is depressed until the arm $M^4$ rotates to connection with the spring $G^4$ corresponding to the button depressed. Up to the time that it rotates to such point the circuit will remain closed, owing to the fact that the intermediate push-buttons are up or in a position to permit their springs $G^4$ to make connection with the ring $H^4$, the circuit being, during such period and after the spring leaves the initial contact, formed through the ring $H^4$, the springs $G^4$, the contact-arm $M^4$, the electro-magnet $O^4$, and out. When, however, the arm reaches the button depressed, the circuit is broken. The rotation of the arm to the open circuited point is produced by means of the electro-magnet $O^4$, whose armature $P^4$ carries an impelling anchor or escapement to engage with an impulse-wheel $T^4$ on the shaft of the circuit-closing arm. The shaft also carries the pointer $R^4$, which rotates with the same, and will come to rest opposite the button depressed when the rotation of the circuit-closing arm ceases.

The face of the transmitter is provided with suitable indications or characters corresponding to those upon the drum type-wheel $O^5$ at the central station. Connection with the circuit is formed at the back of the transmitter by means of the plates $A^6 B^6$, fastened to the insulating-plate $F^4$, in which the push-buttons $E^4$ work, and connecting, respectively, with the ring or contact $H^4$ and with the electro-magnet $O^4$. The plates $B^6 A^6$ rest upon the heads of contact screws or bolts fixed to the base of the transmitter, as shown in Fig. 3, such connection being established whenever the case $D^4$, carrying the working parts of the transmitter, is screwed down or secured to the base-plate.

Circuit-wires 3 4 are attached to the screws or bolts in obvious manner.

The electro-magnet $O^4$ may be a polarized magnet of any desired description. Its armature $P^4$ is in the present case shown as polarized from a flat permanent magnet $S^4$, which is secured to the yoke-piece of the electro-magnet at one of its poles and at its other is provided with bearings for the armature-lever, of soft iron. This electro-magnet $O^4$, which controls or operates the commutator or circuit-changer of the transmitter, might be of any other form or character, but should be properly constructed to respond to the pulsations produced by the apparatus at the central office. When the apparatus is out of use, the contact-arm $M^4$ at the transmitter occupies the unison or zero position, (shown in Fig. 12,) and the push-buttons all being up, owing to the actions of the springs $G^4$, no circuit is formed for any wire or transmitter from the generator and back to the central office. At the central station or office the apparatus is normally in the condition indicated in Fig. 10, the various circuit-controller contacts at $T^2$, $L^3$, and O being in the condition shown, while the connection from any wire 4 through the electric motor or starting-magnet is closed at the contact Q connecting with the stud P of that circuit. The armatures of the magnets and the printing mechanism and type-wheels are in the position shown in Fig. 2, and the cam $O^3$ will be in the position shown in Fig. 10, where it is left on the cessation of movement of the driving-shaft I, carrying the wheel $R^3$.

The general operation of the apparatus would be as follows: On the depression of any push-button in a transmitter the circuit for the station at which said transmitter is located is closed by the pin $I^4$ for that push-button, thereby energizing the electro-magnet C corresponding to the circuit and at the same time energizing the electric motor which drives the shaft K. The movement of the shaft K is communicated to the type-wheel and connected stop-arm by the friction-connections, and said stop-arm begins to rotate and continues to rotate past the retracted armatures of the intermediate electro-magnets until it reaches the electro-magnet of the circuit in action, where it finds the armature drawn up and in position to be struck by the pivoted latch or catch V on the end of the stop-arm. When this occurs, the horizontal arm of the catch V is drawn down behind the armature-lever, and the lever T is operated so as to depress spring O into contact with the stud P, thereby breaking the connection of the magnet and common return to the circuit and forming a connection between said circuit and the message or want printing apparatus. At the same time, owing to the operation of the lever T, on the arrest of the stop-arm a local circuit has been formed for the electric motor at contacts H² I², so that the motor will still continue to rotate and drive the shaft I, although the connection thereof with the general circuit has been broken at the spring Q. The number of type-wheel F corresponding to the station calling will now be opposite the printing-pad E³. During the rotation of the type-wheel to the proper point the circuit should remain closed at the station by keeping the push-button depressed. The user of the apparatus should also be properly instructed to keep the button depressed until the pointer R⁴ moves and comes to a stop opposite the push-button. By the operation of the spring O in the manner already described the circuit calling is now in connection with the pulsator D² and the mechanism for controlling the position of the message or want drum and for controlling the operation of the printing-pad. The moment this connection is formed the pulsator D² begins to produce alternations of current on the circuit containing the transmitter and the magnet A³. The controller-magnets at the transmitter and at the receiving instruments being correspondingly polarized, the first pulsation over the circuit of proper character to operate said magnet will cause their armatures to move, thereby allowing their escape-wheels to move one tooth. The effect of this is at the transmitting-station to move the commutator-spring M⁴ into the intermediate position between the initial or unison contact and the first contact connected with a push-button, where it will be in connection with the last-named contact. At the receiving-station the drum will be moved a half-space toward the initial character upon its surface. At the succeeding pulsation, which is of opposite polarity, the two armatures will be moved in a reverse direction, and at the transmitter the contact-spring M⁴ will be moved into a full connection with the first contact of the series and will rest solely upon the same. At the receiving-station the escapement-wheel will move another step and the drum O⁵ will present its first character in position for printing. At the conclusion of the two pulsations on the line, first of one and then of the other polarity, the spring M⁴ will be in connection with the first contact of the commutator and the escapement of the drum O⁵ will be in the position with relation to the arm V³ shown in Fig. 10. In this position the printing would be effected as hereinafter explained if there should be a cessation to the pulsations. The pulsations being continued, the movement of said commutator and the type-wheel or drum O⁵ will continue in unison through the operation of the pulsator until the open circuit of the transmitter is reached. At this point, the button having been kept depressed, the movement of the commutator and pointer at the transmitter will cease and the drum O⁵ will come to rest with the indication or type corresponding to the depressed button in position opposite the printing-pad E³. During the operation of the pulsator and message or want drum the cam O³ will be controlled in the manner already explained, being frequently moved from action with its driving-surface R³, so that the circuit for the printing-magnet I³ cannot be closed at L³; but the moment that the circuit of the line is broken and the movement of the message-receiving apparatus ceases, the cam O³ will remain in contact for a prolonged period sufficient to permit the circuit-controller L³ to bring the magnet I³ into action. The printing-pad E³ is then drawn forward to effect the impression, but in coming forward it allows only a limited movement of the paper-ejecting mechanism, as before explained. The operator at the station observing now that the pointer or index-hand is opposite the point depressed relieves the pressure on the button, whereby the circuit is closed at the station, owing to the contact between the spring G⁴ with the contact-plate H⁴. The circuit for the pulsator and the controller-magnet A³ is now again complete, and the parts begin to again move under the control of such pulsator with the effect of moving the arm V³ of the circuit-controller L³, so as to open the circuit of the printing-magnet. The armature of the latter now recedes and produces a complete release of the paper-ejecting mechanism in the manner before explained, so that the matter printed from the wheels F O⁵ is thrown out into position to be detached from the ribbon D³. In the meantime, the pulsator being in condition to act upon the apparatus, the movement of the type-drum O⁵ and of the commutator at the station continues under the action of the controlling-magnet, as before explained, and if no other push-button is depressed the circuit will remain closed through the commutator and the various springs G⁴ and plate H⁴, so that the pulsator may act upon the circuit and magnets until the commutator has revolved to the unison-point, or that where the spring M⁴ bears on the end of the wire L⁴. At this point the circuit is opened, and the type-drum O⁵ having been rotated also to zero-point, will, with the transmitting apparatus, come to rest. It is obvious, however, that at any intermediate point between the button first depressed and the zero-point another button might have been depressed, with the effect of printing a second message, or letter forming a part of a message, in the manner already explained, since in this case the relieving of the pressure on the button first depressed would close the circuit as before and the parts would continue to act until the commutator-spring at the transmitter finds the contact at which the second button had opened the circuit. Just before the parts reach the zero position, as before explained, the circuit changer or controller $T^2$ will come into action, its circuit having been already partially completed at contacts $H^2$ $I^2$ at the moment the stop-arm of the wheel F is brought to rest. When this magnet is actuated, the lever T is moved, with the effect of resetting the apparatus to the original or starting position. The unlatching of the armature-lever D is produced by the fact that the lever T is moved forcibly in a direction to lift the horizontal arm of the latch. The arm $C^2$ is moved in a direction to carry the cam $E^2$ away from spring O', and the contact $G^2$ is moved in a direction to open the connection between the contacts $I^2$ $H^2$. The armature-lever D being thus permitted to fall back will retain its retracted position, owing to the fact that the circuit of the transmitter has been broken in the transmitter itself when the zero-point is reached, and the stop-arm is now ready to resume its movement until it finds the armature-lever of another circuit in attracted position. Such movement is obviously not resumed until the closure of circuit again at some other station or at the station first supposed to be in connection.

It is to be observed also that the motor will come to rest and the shaft I cease to move, because the circuit will be open at the transmitter, although the resetting-magnet may have restored connection with the motor at spring Q when it breaks the local connection for the battery L $B^3$ at contacts $I^2$ $H^2$.

It will also further be seen that the moment the motor begins to move with the wheel F the winding-pawl for the paper-ejecting mechanism will begin to wind up the spring ready for the operation of the printing-pad.

It will also be seen that during the rotation of the wheel F by the frictional connection with the shaft I the wheel M may remain at rest, while after the wheel F has been brought to rest at the proper point the wheel M may begin to rotate and move the type-wheel under the control of the electro-magnet $A^3$ without interference from the wheel F.

I have described one form of device for controlling the printing-pad of the apparatus when the type-drum comes to rest; but it is obvious that other devices might be used without departing from the general principles of the combinations hereinafter claimed, and I do not limit myself to the special resetter or device; nor do I limit myself to the details of the devices for effecting restoration of the parts to their original positions, the gist of this part of the invention consisting in resetting the switches and unlocking or resetting the stop-arm by devices controlled or operated from the message or want indicator or wheel when the latter approaches or reaches the zero or unison position.

It is obvious, further, that the forms of electro-magnet employed might be indefinitely varied, and that any kind of a pulsator known in the art might be used in place of the pole-changer. I prefer, however, to use a pulsator which shall produce alternations of electric currents on the circuits.

In Fig. 15 I have illustrated the application of the apparatus for use in connection with several central offices. The transmitter $A^4$ is placed at the station connected by lines 10, 11, and 12 with the several receiving-stations $H^7$, $H^6$, and $H^8$—such, for instance, as a stable, office of a district telegraph company, and a restaurant. The transmitter $A^4$ may be placed in connection with any one of said lines by means of a switch plug or button $A^5$ of obvious construction. The face of the transmitter has a dial or index-mark to correspond with the usual messages to be transmitted to the stations $H^6$, while supplemental dials $B^7$ $B^8$ are provided for use in connection with the apparatus when employed for transmitting signals over the circuits 10 or 12. The dials or cards $B^7$ $B^8$ are marked to correspond with the usual wants or messages to be sent to the stations $H^7$ $H^8$, and a number corresponding to the several push-buttons of the instrument $A^4$ is placed opposite each one. By depressing the properly-numbered push-button the corresponding want may be transmitted to be received upon a printing apparatus provided with the proper characters at the stations $H^7$ $H^8$.

For the sake of convenience and to guard against mistakes in the use of the apparatus the connecting plates or sockets which receive the plug $A^5$, and which are connected with the several lines 10 12, are placed in proximity to the cards or indexes $B^7$ $B^8$ corresponding to said lines.

What I claim as my invention is—

1. The combination, substantially as described, of a series of independent controlling-circuits, a rotary type-wheel controlled in common by said circuits and bearing characters corresponding to the designation of the circuits, a want or message printing wheel, a transmitter therefor placed in each of the independent circuits and having a series of keys adapted to act upon the circuits at different points in the revolution of a circuit-closing arm connected with said circuit, an actuating or controlling magnet for said circuit-closing arm, and a pulsator connected with the driving mechanism for the message-wheel, as and for the purpose described.

2. The combination of the revolving stop-arm, stop devices therefor, the independent controlling-circuits separately connected with circuit-closing stations, an impelling electric motor in the normally-closed common connection for said circuits, a normally-open local circuit for the motor controlled by the stop devices, and a circuit-breaker between the motor and each line, said circuit-breaker being connected with the stop devices, as and for the purpose described.

3. The transmitter on a normally-open circuit and having a series of circuit-closers each adapted to close the normally-open circuit, in combination with the commutator or circuit-changer provided with a series of contacts severally connected with the normally-closed contacts of circuit-breakers corresponding to the circuit-closers, as and for the purpose described.

4. The combination, with the station-indicating mechanism, of a want or message receiver, electric switches disposed at the various stop-points of the station, indicating mechanism for controlling the connection of the message-receiver to the wire of a station calling, an actuating arm or lever controlled in its action by the device which brings the station-indicating mechanism to rest, and a simultaneously-actuated switch-contact in the connection of the circuit calling through the common return-wire.

5. The combination, with an impelling-shaft, of a room or station indicating device frictionally connected with said shaft, a series of separate stations or circuits controlling the position of the same, a want or message transmitter in each circuit, and a want or message indicator or receiver common to the circuits and also frictionally connected with the impelling-shaft, as and for the purpose described.

6. The combination, with a rotating stop-arm and stop devices therefor controlled from each of a number of independent stations or lines, of an impelling electric motor in the common return for said lines and a frictional connection between the motor and the shaft of the stop-arm.

7. The combination, with the rotating stop-arm and a number of independent lines, each controlling a stop device for said arm, of an impelling electric motor and an electric switch controlled by the stop devices for completing a local circuit for the motor when the stop-arm is brought to rest.

8. The combination of the station-indicating type-wheel, a series of independent controlling-circuits therefor, a message or want type-wheel, a transmitter for the latter in each of the independent circuits, and a printing-magnet for the same having also a printing pad or surface for the station-indicating wheel.

9. The combination, with the type-wheel and the printing pad or lever therefor, of the feed-roll, the actuating-spring, the winding-pawl for said spring actuated by the shaft which drives the type-wheel, and a stop or detent for the feed-roll carried by the printing-lever.

10. The combination, with the rotary stop-arm and its impelling electric motor, of a local circuit-closer for the latter controlled by the stop devices and a circuit-breaking magnet moving with the stop-arm and controlling the said local circuit, as and for the purpose described.

11. The combination, with a rotary station or circuit indicating device controlled from a number of separate stations, of a series of stop-magnets disposed in the circumference of revolution of said device, a latch or lock for temporarily holding the armature of the magnets in stopping position, and the releasing electro-magnet for withdrawing the latch or lock, as and for the purpose described.

12. The combination, with the room or station indicator and the impelling electric motor therefor included in a circuit common to the several stations, of a local circuit-closer for said motor, a message or want indicating wheel driven by the motor, a magnet for opening the local circuit, and a circuit-controller for said magnet actuated by the want-indicating mechanism at or near the zero-point, as and for the purpose described.

13. The combination, with a rotary stop-arm and a catch or latch for holding the same in the station or circuit indicating position, of a want or message receiver, an unlatching electro-magnet for the stop-arm, and a circuit-controller for the latter governed by the want or message receiver, as and for the purpose described.

14. The combination, with the station or circuit indicator controlled by a number of independent circuits, as described, of an alternating-current pulsator in a circuit common to said lines, a type-wheel having a controller-magnet also in said common circuit, and a transmitter at each station having a controlling or actuating magnet responsive to the reversals of current.

15. The combination of a series of transmitters in normally-open circuits, a station-indicator common to the same, a series of stop-magnets, one in each normally-open circuit, a want or message indicator having an actuating or controlling magnet responsive to reversals of current, an alternating-current pulsator driven with said indicator, and at each station an actuating or controlling magnet for the transmitter responsive also to reversals of current.

16. The combination, with the type-wheel and the tape-ejecting mechanism, of an actuating-spring for said mechanism and a re-winding device for the spring driven by the actuating-power of the type-wheel.

17. The combination, with the type-wheel, of the spring-actuated feed-wheel for ejecting the printed strip or tape, a detent or catch for said feed-wheel governed by the printing pad or lever, and a winding-pawl mounted on a support driven by the actuating-motor which is connected with the type-wheel.

18. The combination, with the rotating stop-arm, of a series of stop electro-magnets, a catch or latch carried by the stop-arm for engaging and holding up the armature of any magnet in action, and an unlatching-magnet and armature rotating with the stop-arm, as and for the purpose described.

19. The combination, with a station or circuit indicator controlled by independent circuits leading from separate transmitting-stations, and each including the circuit, of a stop-magnet, a latch or lock for holding the indicator in station-indicating position, and a magnet independent of a stop-magnet for unlocking said latch or lock, as and for the purpose described.

20. The combination, with the spring-actuated feed-wheel, of the rewinding ratchet-wheel and its retaining-pawl and a lifting arm or projection for the latter connected with the wheel by devices having a lost motion, as described.

21. The combination, with the rewinding ratchet-wheel, of the lifting arm or projection for the retaining-pawl of said wheel and a resetting arm or projection for carrying the lifting device beyond lifting position, said resetting-arm being connected with the spring-driven wheel or shaft, which is intermittently released.

22. The combination of a series of push-buttons, each connected with a spring arm or contact and normally tending to make connection electrically with a common plate or stop, of a second plate or stop common to the push-buttons and connected with the zero or unison contact of the rotary commutator, and means controlled by each push-button for completing the electric circuit of the transmitter through said zero or unison contact when any button is depressed.

23. The combination, with the rotary commutator and a unison or zero contact therefor connected to a series of normally-open switches or circuit-closers, of a series of circuit-breaking switches corresponding to the wants or calls and connected normally with contacts of the commutator and a controlling or actuating magnet for said commutator in the line-circuit common to said contacts, as and for the purpose described.

24. In a combined station and want call apparatus, a series of controlling-transmitters in independent circuits, each normally open at the transmitter, each of said transmitters having a series of keys corresponding to the wants or calls and arranged to act on the circuit at different points in the revolution, of a circuit-controlling arm and a circuit-closing device connected with each of the series of keys for completing the normally-open circuit when the key is depressed, whereby the circuit may be closed and the apparatus started into operation on the depression of any key, as and for the purpose described.

25. The combination, with the dial-transmitter, of the supplemental dials or indexes and connecting or switch devices for connecting the instrument with the lines corresponding to said dials, as and for the purpose described.

26. The combination, with the dial-instrument having means for connecting it with different central stations, of the supplemental cards or indexes $B^7$ $B^8$, inscribed with the wants or messages to be transmitted to such stations and with characters opposite the wants corresponding to the push-buttons of the transmitter.

27. The combination of the series of contacts, the contact-spring moving over the same, but normally out of connection therewith, the stop-magnets for controlling the movements of the moving support for the contact-spring, and an actuating arm or lever carried by the supporting-arm for the spring and arranged to engage with a stop and bring the spring into connection with a contact, as and for the purpose described.

28. The combination, with the type-wheel and its printing-magnet, of a circuit-controller for the latter carried by a reciprocating arm, a cam of irregular outline normally holding the circuit-controller out of operating position and engaging intermittently with a driving-surface which tends to rotate the cam into position for permitting the circuit-controller to act, and a spring which tends to rotate the cam in the opposite direction.

29. The combination, with the rotary arm or station-indicator, of stop devices for stopping the same at any one of a number of points in its revolution, a lock for holding the stop in position to arrest the indicator, and a releasing-magnet acting on the latch at any point in the revolution of the wheel.

30. The combination, with the station and want call at the common office, of a series of transmitters, each on normally-open circuit, and a commutator in each transmitter having a series of normally-open contacts connected, consecutively, to a series of normally-closed switches corresponding to the wants or calls and each adapted to open the circuit of the commutator-contact, as and for the purpose described.

31. In a combined station and want call apparatus, a series of transmitters on normally-open circuits, a commutator in each transmitter, a step-by-step controlling-magnet therefor in each transmitter, means for closing a branch circuit independent of the commutator, and a pulsator at an office common to the circuits, whereby the commutator may be caused to swing from its zero or unison point toward the want or call indicating point in unison with the central-station device.

32. In a transmitter, the combination of a series of push-buttons connected severally with the contacts of a commutator or circuit-changer, of a branch of the circuit upon which the transmitter is placed around the contacts of the commutator and a circuit-closer operated by each push-button for closing said branch upon depression of any key.

33. The combination, with the transmitter at a station on a normally-open circuit, of a commutator having a series of circuit-closing points and a zero-contact on normally-open circuit, as described, and a controlling-magnet in the circuit of the commutator, whereby the instrument is brought to rest automatically on the completion of its revolution.

34. The normally-open circuit-transmitter having a fixed zero-contact on normally-open circuit for bringing the transmitter to rest at every complete revolution, a controlling-magnet in the circuit of the commutator, a branch circuit, and means for closing said branch circuit at any point in the revolution of the transmitter independently of the zero-contact.

35. The combination of the series of independent circuits connected to a common receiving mechanism, a magnet in each circuit, a rotary transmitter controlled by such magnet, an open-circuiting zero-point for bringing the transmitter to rest at the completion of each whole revolution, a branch around it, a circuit-closer for the same, and a pulsator at the common station.

36. The combination, with the room or station indicating type-wheel, of a want or message type-wheel, a series of controlling-stations in independent circuits, a controlling-magnet for the want or message type-wheel in a circuit common to said stations, a paper strip common to both type-wheels, a printing-lever, and a spring-driven paper-ejecting mechanism controlled by the printing-lever.

37. The combination, with a station type-wheel controlled from a series of independent lines common to said wheel, of a want or message printer common to said lines and placed in a connection normally or when the apparatus is at rest disconnected from said lines, transmitters for the want or message printer at stations on each of said independent lines, and a circuit-closer connected with the several lines, and the want or message printer common to them for closing the connection of the line calling with said printer.

38. The combination, substantially as described, of a series of independent controlling-circuits, a rotary type-wheel controlled in common by said circuits, a want or message type-wheel having a controlling-magnet in a connection common to said independent controlling-circuits, a transmitter therefor in each circuit, a paper strip common to the two type-wheels, and a printer for taking the impression from the first-named type-wheel controlled by the transmitter of the want or message type-wheel.

39. The combination, substantially as described, of a series of independent circuits, a station common to said circuits, a type-wheel controlled by the same and bearing characters corresponding to the designations of the circuits, a transmitter in each circuit having a rotary commutator and controlling-magnet, a want or message type-wheel common to the circuits and controlled by said transmitters, and a paper strip and printing device common to the said type-wheels.

40. The combination, substantially as described, of a series of independent circuits, each having a station containing a transmitter, an office common to said circuits containing a station type-wheel, with stop devices for bringing the same to rest in position corresponding to the separate circuits closed, a message type-wheel having a controlling-magnet in a connection common to the said independent circuits for printing the message sent by any transmitter, and a resetter for the station type-wheel controlled by the message-receiver, whereby on the completion of the message from any station the station type-wheel may be automatically freed and permitted to rotate into position for printing the number of another station.

41. The combination, substantially as described, of a number of separate transmitting-stations in lines branching from a common office, a transmitter at each station having a rotary circuit closer and breaker and controlling-magnet for the same in the circuit of the transmitter, an office common to the circuits containing a type-wheel bearing characters corresponding to the stations and controlled in common by the same, a second or message type-wheel mounted beside the first, a controlling-magnet for the message type-wheel in a connection common to the independent circuits, and switches or circuit-closers connected with the several circuits and with said magnet for throwing the same into the circuit with the magnet and circuit closer and breaker of the transmitter which is operated.

Signed at New York, in the county of New York and State of New York, this 8th day of May, A. D. 1888.

MAJOR DANE PORTER.

Witnesses:
 WM. H. CAPEL,
 HUGO KOELKER.